June 5, 1965   B. C. LACKMAN   3,187,554
SHOCK ABSORBER TESTER
Filed Sept. 5, 1963
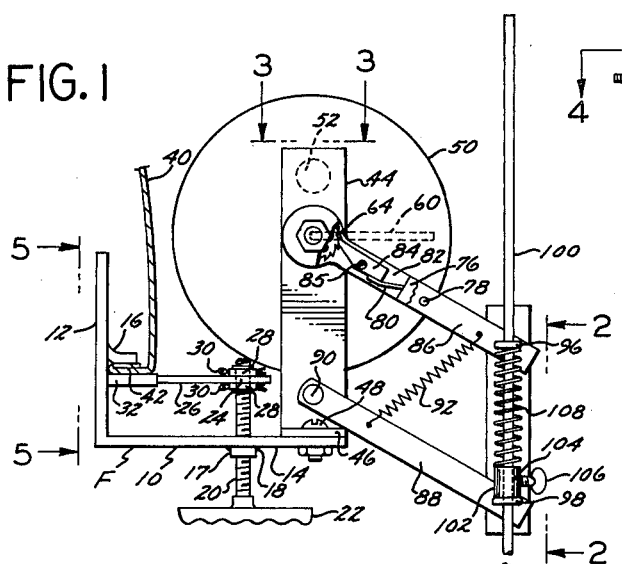
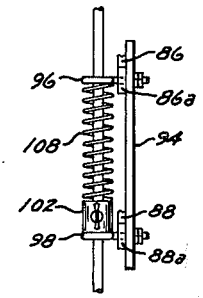
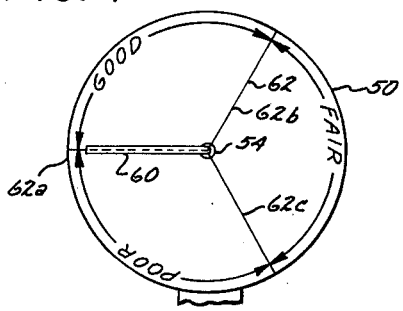
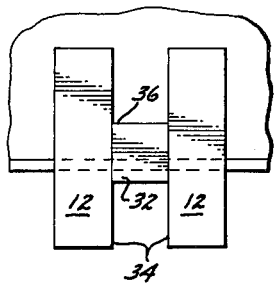
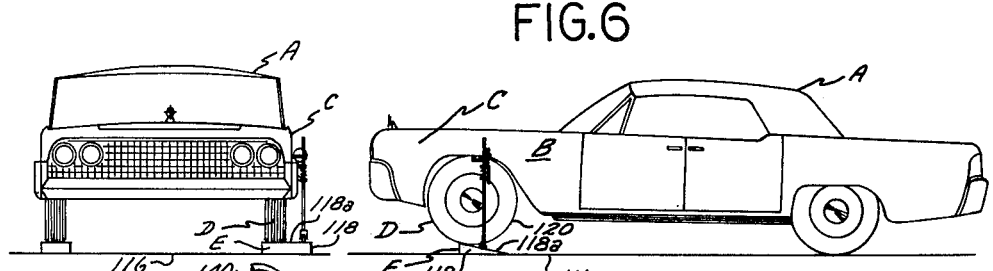
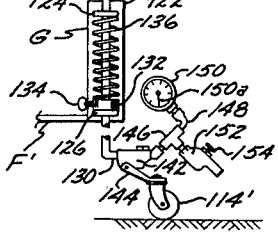
INVENTOR.
BURDETTE CARL LACKMAN
BY
William C. Boterek
ATTORNEY United States Patent Office 3,187,554
Patented June 8, 1965

3,187,554
SHOCK ABSORBER TESTER
Burdette Carl Lackman, Westminster, Calif.
(215 S. Sullivan St., Santa Ana, Calif.)
Filed Sept. 5, 1963, Ser. No. 306,781
8 Claims. (Cl. 73—11)

The present invention relates generally to the field of automotive equipment, and more particularly to testing shock absorbers on an automotive vehicle while in place thereon.

Hydraulic shock absorbers are used almost universally on passenger carrying automotive vehicles, and serve to minimize the oscillatory movement of the sprung portion of the vehicles relative to the unsprung portions thereof.

Shock absorbers are normally concealed within the confines of an automotive vehicle, and to remove the same for inspection or testing purposes is a troublesome and time-consuming operation. In the past, various types of testing units have been evolved for testing shock absorbers as to their operating characteristics, but these devices in the main have had the disadvantages that they were bulky, expensive, complicated in structure, and required personnel having a high degree of skill to operate.

A primary object of the present invention is to provide a preferred and alternate form of shock absorber tester that have extremely simple mechanical structures, are quick and easy to use, permit the testing of shock absorbers while they remain in place on a vehicle, and can be successfully operated by personnel having little or no experience in testing work.

Another object of the invention is to supply shock absorber testing equipment that is compact and occupies a minimum of space when not in use, and due to its low cost of production can be retailed at a sufficiently low price to permit its purchase by anyone doing an appreciable volume of automotive maintenance work.

These and other objects and advantages of the inventions will become apparent from the following description thereof, and from the drawings illustrating the same in which:

FIGURE 1 is a side elevational view of the preferred form of the device, but with the ground contacting roller disposed ninety degrees from the position it would occupy in a testing operation;

FIGURE 2 is a fragmentary end elevational view of the device taken on the line 2—2 of FIGURE 1;

FIGURE 3 is a fragmentary top plan view of the device taken on the line 3—3 of FIGURE 1;

FIGURE 4 is a front elevational view of a calibrated dial;

FIGURE 5 is a fragmentary end elevational view of the device taken on the line 5—5 of FIGURE 1;

FIGURE 6 is a side elevational view of an automotive vehicle with the device mounted in a testing position thereon;

FIGURE 7 is a front elevational view of the vehicle shown in FIGURE 6 with the device mounted thereon; and FIGURE 8 is a side elevational view of a first alternate form of the device.

Referring now to the drawing, an automotive vehicle A is shown that has a sprung portion B of which fenders C are a part, and unsprung portion of which the wheels D are a part. The function of automotive shock absorbers (not shown) is to minimize the oscillatory movement of the sprung portion B to the unsprung portion as the vehicle A travels over a rough road surface or an irregular terrain. The shock absorbers achieve the above function of dampening out the oscillatory movement by using the energy that tends to cause the same to move hydraulic fluid through passages that offer high resistance to such flow. Accordingly, the degree of effectiveness of the shock absorbers on the vehicle A will be inversely proportional to the number of oscillations that the sprung portion B of the vehicle makes relative to the wheels D, after one or more of the wheels is allowed to run off a sharp drop-off E, as best seen in FIGURE 6.

In the preferred form of the invention, best seen in FIGURE 1, two laterally spaced L-shaped members 10 are provided, each of which includes a vertical leg 12 and horizontal leg 14. The two legs 12 have prongs 16 extending outwardly therefrom. Legs 14 are connected by a transverse crosspiece 17 that is welded by beads 18 thereto. Crosspiece 17 has a centrally disposed tapped bore (not shown) therein that is engaged by a a threaded rod 20. The rod 20 on the lower end has a circular handle 22 rigidly affixed thereto.

The upper end of rod 20 is rotatably mounted in a transverse bore 24 formed in one end portion of a pressure bar 26. Two nuts 28 are rigidly affixed to rod 20 and are disposed above and below bar 26. Nuts 28 are held in non-rotatable positions on rod 20 by cotter keys 30 that extend through transverse passages (not shown) formed in both the rod and nuts. Pressure bar 26 is of such width that an end portion 32 thereof may be disposed in space 34 defined between members 10. End portion 32 is bent or otherwise formed to define an upwardly extending tab 36 (FIGURE 5).

The fender C, as is conventional with such structures, is defined by a downwardly extending side wall 40 that terminates in a rolled over, inwardly extending bead 42. The entire mechanical assembly previously described, referred to generally as a bracket F, is removably mounted on fender C by causing prongs 16 to engage the upper surface of bead 42, and pressure bar 26 the under surface thereof. By rotating handle 22 in an appropriate direction, the bar 26 may be moved upwardly for the bead 42 to be pressure gripped between it and prongs 16.

An upright 44 having a base 46 extending outwardly therefrom is affixed to the outer end of leg 14 by a screw 48 or other conventional fastening means. A circular calibrated dial 50 (best seen in FIGURE 4) is supported from the upper portion of upright 44 by one or more short connectors 52. Dial 50 has a centrally disposed opening 54 therein. A shaft 56 extends through an opening 58 in the upper portion of upright 44 and opening 54, as best seen in FIGURES 1 and 3. The outer end portion of shaft 56 is bent to define a normally disposed hand 60. The hand 60 when rotated reads against calibrations 62 on dial 50 to indicate the operative condition of shock absorbers on vehicle A as will later be explained in detail.

A ratchet wheel 64 is rigidly mounted on shaft 56. Two elongate, parallel, laterally separated plates 66 are provided that have openings in first end portions 68 thereof that pivotally engage shaft 56. End portions 68 are disposed on opposite sides of ratchet wheel 64. Two nuts 70 and 72 are mounted on threads 74 formed on shaft 56 and serve to prevent the shaft being displaced from upright 44. An elongate spacer bar 76 is disposed between plates 66 outwardly from ratchet wheel 64, as best seen in FIGURES 1 and 3. The spacer bar 76 and plates 66 are held together as an integral unit by a transversely positioned rivet 78. A spring clip 80 extends from spacer bar 76 towards ratchet wheel 64 as best seen in FIGURE 1. The spring 80 is disposed in a longitudinally extending space 82 defined between the inner end portions 68 of plates 66. A pawl 84 is pivotally supported in space 82 on a pin 85 that extends between plates 66. Spring 80 maintains pawl 84 in pressure contact with ratchet wheel 64 at all times. The plates 66 and spacer bar 76 when held together as an integral unit by rivet 78 define an upper arm referred to generally by the numeral 86.

A lower arm 88 is pivotally supported on the inner end portion thereof on a rivet 90 that is affixed to the upright 44. The upper arm 86 and lower arm 88 are spaced from one another a substantial distance. A tensioned helical spring 92 extends between arms 86 and 88, best seen in FIGURE 1.

An elongated spacer plate 94 is provided as best seen in FIGURES 1 and 2 that has two longitudinally spaced eye bolts 96 and 98 secured thereto by nuts 96a and 98a respectively. The outer portions of arms 86 and 88 have transverse bores 86a and 88a respectively formed therein that pivotally engage shank portions of eye bolts 96 and 98 (FIGURE 2).

Eye bolts 96 and 98 are longitudinally aligned and have a rod 100 movably mounted therein. A cylindrical collar 102 is slidably mounted on rod 100 and disposed between eye bolts 96 and 98. Collar 102 has a tapped transverse bore 104 therein that is engaged by a thumbscrew 106. When thumbscrew 106 is tightened, the collar 102 is held at a desired longitudinal position on rod 100. A compressed helical spring 108 encircles rod 100, and one end thereof bears against eye bolt 96, with the other end bearing against collar 102.

The lower end of rod 100 develops into a short horizontal extension 110 that supports a caster assembly 112 which includes a roller 114. Roller 114 is adapted to roll along the surface 116 that supports wheels D. A wedge-shaped block 118 is provided that is substantially wider than one of the tires 120 on wheels D. The block 118 must have an inclined surface 118a which is sufficiently wide that one of the wheels D and roller 114 can concurrently roll upwardly thereon and then abruptly drop to the surface 116.

When it is desired to test the shock absorbers on a vehicle A, the tester of the present invention is removably attached to a front fender C thereof as previously explained, and as illustrated in FIGURE 1. The thumbscrew 106 is then loosened, and the rod 100 vertically adjusted to place the roller 114 in contact with surface 116 as shown in FIGURE 1.

After roller 114 has been adjusted to contact surface 116, the thumbscrew 106 is tightened to hold collar 102 at a fixed position on rod 100. Spring 108 is at all times under compression and tends to maintain the lower end of collar 102 in pressure contact with eye bolt 98. The spring 92 is tensioned at all times, and tends to maintain the arms 86 and 88 in the downwardly extending positions shown in FIGURE 1.

After the device has been adjusted in the manner described, the hand 60 is rotated to bring it in alignment with calibration line 62a (FIGURE 4). Vehicle A is then driven forwardly to permit the roller 114 and wheel D most adjacent thereto to concurrently travel up the inclined surface 118a and then drop from the lefthand end thereof to the surface 116.

When the front wheel D shown in FIGURE 6 drops off the inclined surface 118a to the surface 116, the sprung portion B of the vehicle, together with the fender C, moves downwardly relative to the unsprung portion of the vehicle. This downward movement is resisted by the springs (not shown) of the vehicle A and the shock absorbers (also not shown) on the vehicle. If the vehicle A were not equipped with shock absorbers, the sprung portion B of the vehicle would tend to oscillate up and down relative to the unsprung portion thereof, after the front wheel D had been driven from the inclined surface 118a.

This oscillatory movement of the unsprung portion B of the vehicle A tends to be dampened out by the shock absorbers on the vehicle. The more perfectly the shock absorbers (not shown) on the vehicle A operate, the less the oscillatory movement of the sprung portion B of the vehicle after the front wheel D shown in FIGURE 6 is driven off the inclined surface 118a. When the sprung portion B of vehicle A moves downwardly relative to the unsprung portion thereof, the tester (FIGURE 1) moves therewith. Downward movement of the device shown in FIGURE 1 causes the arms 86 and 88 to pivot in a counterclockwise direction on the eyebolts 96 and 98, and as such pivotal movement takes place the pawl 84 rotates the ratchet wheel 64 and hand 60 to which it is connected.

In FIGURE 1 it will be noted that due to the arrangement of the pawl 84 and ratchet 64, the hand 60 is only moved by downward movement of the sprung portion B of the vehicle A relative to the ground surface 116. The dial 50 (FIGURE 4) has calibration lines 62 thereon, which are further identified by the numerals 62a, 62b and 62c. The segmental area between the lines 62a and 62b is visually marked either by color (not shown) or imprinting to indicate when the hand remains in this area, that the shock absorbers (not shown) are in "Good" condition. If the hand 60 is rotated in the manner described to move into the area between the calibration lines 62b and 62c, the shock absorbers are indicated to be in "Fair" condition. If the hand 60 is rotated as a result of the test to move into the area defined by the calibration lines 62c and 62a, the shock absorbers will be indicated as being in "Poor" condition and doing little, if anything, to dampen out the oscillatory movement of the sprung portion B of the vehicle A relative to the unsprung portion thereof.

The calibration of dial 50 is established by testing a vehicle having shock absorbers that are known to be in good condition, fair condition and poor condition, and the degree of rotation of the hand 60 for each type of shock absorbers is recorded on the dial, with the calibration lines 62a, 62b, 62c thereafter being imprinted on the dial as a result of the information empirically obtained in this manner.

From experience it has been found that the shock absorbers on a vehicle will all deteriorate at a substantially equal rate, and if one of the shock absorbers is found to be in a poor condition, it may be safely assumed the balance of the shock absorbers are in a like condition. Thus, in testing the shock absorbers on a vehicle, only one of the shock absorbers need be tested, which makes for ease in the testing operation as well as shortening of the period required for the tests.

After the testing device has been used on a vehicle A, the handle 22 is rotated in an appropriate direction to permit the clamp F and the balance of the mechanism associated therewith to be removed from the vehicle. Testing of the vehicle A is then completed, and the preferred form of the testing device shown in FIGURE 1 may be stored in a safe place until again needed.

An alternate form G of the invention is shown in FIGURE 8, which includes a bracket F' that is identical to bracket F, and permits the device to be removably affixed to a fender C of a vehicle A. A vertical plate 122 is supported by bracket F', and two vertically spaced eyebolts 124 and 126 are supported by the plate. A rigid tube 128 is slidably supported in eyebolts 124 and 126. The lower end of tube 128 develops into a horizontal extension 130.

A collar 132 is mounted on tube 128 and disposed between eyebolts 124 and 126. A thumbscrew 134 engages a transversely disposed tapped bore (not shown) formed in collar 132. When thumbscrew 134 is tightened, the collar 132 can be held at a desired position on tube 128. A compressed helical spring 136 encircles tube 128 between eyebolts 124 and 126, and at all times tends to maintain collar 132 in contact with the lower eyebolt 126.

By means of a conventional fitting 138, the upper end of tube 128 is connected to a flexible hose 140 that extends to a source of air under pressure (not shown). Extension 130 is connected to the inlet of a valve 142 that is normally closed, but is placed in an open position when a handle 144 pivotally supported therefrom is moved upwardly relative to the valve (FIGURE 8) in a counter-clockwise direction. Handle 144 rotatably supports a roller 114' that is identical to roller 114 and serves the same function.

The air outlet of valve 142 is connected to a tubular T 146. T 146 is connected to a tubular L 148 which in turn is connected to a conventional pressure gauge 150. The T 146 is also connected to a second valve 152 that is normally closed, but may be placed in an open position by pressing inwardly on a spring-loaded handle 154 forming a part of the valve.

The first alternate form of the device is mounted on the vehicle A in the same manner as the preferred form thereof, and the vehicle is then driven so that the roller 114' and the wheel D most adjacent thereto will travel up the inclined surface 118a and then drop to the surface 116. When the sprung portion B, fender C, and the first alternate form G of the device move downwardly relative to the unsprung portion of the vehicle and the ground surface 116, the roller 114' is in contact with surface 116 and causes handle 144 to pivot in a counter-clockwise direction to open valve 142.

When valve 142 is open, air will flow from tube 128 to T 146, L 148, and gauge 150, and a needle 150a on the gauge indicates this increase in pressure. This indication of increased pressure on gauge 150 is related to the operating condition of the shock absorbers on vehicle A. The less the sprung portion B of the vehicle A oscillates relative to the ground surface 116 after the drop-off above described, the better is the operation of the shock absorbers thereon to dampen out such oscillations. Therefore, the lower the reading on the pressure gauge 150 after the test above described, the better the operating condition of the shock absorbers being tested. If desired, the face of the gauge 150 can be calibrated to indicate "Good," "Fair" and "Poor" as shown in FIGURE 4, or colors may be used to designate the condition of the shock absorbers being tested.

After the test is completed, the handle 154 is pressed inwardly to bleed compressed air from the first alternate form of the tester, and the needle 150a then returns to its initial position. The first alternate form of the device is then removed from the vehicle A and stored until again needed.

Although the present invention is fully capable of achieving the objects and providing the advantages hereinbefore mentioned, it is to be understood that it is merely illustrative of the presently preferred embodiments thereof and I do not means to be limited to the details of construction herein shown and described, other than as defined in the appended claims.

I claim:

1. A device for testing shock absorbers on an automotive vehicle that has fenders supported from a sprung portion thereof and wheels that support an unsprung portion of said vehicle, including:
    (a) a bracket;
    (b) first means for removably affixing said bracket to one of said fenders;
    (c) a roller;
    (d) an upright supported by said bracket;
    (e) first vertically movable means pivotally supported by said upright for rotatably maintaining said roller in contact with the surface on which said wheels rest; and
    (f) rotatable visual indicating means for showing the operative condition of the shock absorber being tested which is actuated by downward movement of said sprung portion, bracket and upright relative to said roller and said first means when one of said wheels and said roller is driven off an abrupt drop-off onto a floor surface.

2. A device as defined in claim 1 wherein said first vertically movable means comprises:
    (a) an upper arm and lower arm that are vertically spaced and parallel to one another, said arms having transverse bores in the outer and inner end portions thereof;
    (b) a spacer plate;
    (c) two vertically spaced eyebolts mounted on said spacer plate that pivotally engage said bores in said outer portions of said arms;
    (d) a rod slidably supported in said eyebolts;
    (e) means on the lower end of said rod for rotatably supporting said roller;
    (f) a collar mounted on said rod and disposed between said eyebolts;
    (g) a spring that at all times tends to maintain said collar in contact with the lowermost one of said eyebolts;
    (h) a rivet affixed to said upright that pivotally engages said bore in said inner end portion of said lower arm;
    (i) a shaft rotatably supported on said upright that is pivotally engaged by said bore in said inner end portion of said upper arm;
    (j) a ratchet wheel affixed to said shaft; and
    (k) a pawl pivotally supported from said upper arm that engages said ratchet wheel and rotates said ratchet wheel and shaft when said bracket moves downwardly relative to said roller, with said rotation of said shaft and ratchet wheel actuating said indicating means.

3. A device as defined in claim 1 wherein said rotatable visual indicating means comprises:
    (a) a calibrated dial supported on said upright;
    (b) a shaft rotatably supported in said upright and extending through a centrally disposed opening in said dial; and
    (c) a hand rigidly affixed to said shaft, and adapted to sweep over said calibrated dial to indicate the operative condition of a shock absorber being tested, and said shaft and hand being rotated by said first vertically movable means when said sprung portion of said vehicle moves downwardly relative to said roller.

4. A device as defined in claim 2, which further includes means for adjusting said collar to a desired longitudinal position on said rod for said rod to support said roller in contact with the surface on which said wheels rest.

5. A device as defined in claim 2 in which said spring is of helical shape and is disposed in an encircling position on said rod, with said spring being of such length as to at all times be in compression, said spring having the upper end thereof in abutting contact with the uppermost one of said eyebolts, and the lower end of said spring in abutting contact with the upper surface of said collar.

6. A device as defined in claim 2, which further includes a tensioned spring that extends between said arms to at all times tend to maintain said arms in a position where said roller is in contact with the surface on which said wheels rest.

7. A device for testing shock absorbers on an automotive vehicle that has fenders supported from a sprung portion thereof and wheels that support an unsprung portion of said vehicle, including:
    (a) a bracket;
    (b) first means for removably affixing said bracket to one of said fenders;
    (c) a roller;
    (d) a normally closed valve that includes a spring-loaded handle;
    (e) means for rotatably supporting said roller from said handle;
    (f) a tube connected to the inlet of said valve, and said tube supporting said valve from the lower end thereof;
(g) means for connecting the upper end of said tube to a source of air under pressure;
(h) means for movably supporting said tube from said bracket with said roller in contact with the surface on which said wheels rest; and
(i) an air pressure gauge connected to the outlet of said valve to indicate an increase in air pressure on the downstream side of said valve when said valve is opened by said valve moving downwardly relative to said handle when one of said wheels and rollers is driven off an abrupt drop-off, and the increase in said air pressure being related to the operative condition of said shock absorbers on said vehicle.

8. A device as defined in claim 7 which further includes means to bleed off the air on the downstream side of said valve to the ambient atmosphere when said valve is in a closed position.

References Cited by the Examiner
UNITED STATES PATENTS

| 2,934,940 | 5/60 | Beissbarth | 73—11 |
| 3,030,796 | 4/62 | MacMillan | 73—11 |

RICHARD C. QUEISSER, *Primary Examiner.*

DAVID SCHONBERG, *Examiner.*